US 8,850,461 B2

(12) United States Patent
Tsou

(10) Patent No.: US 8,850,461 B2
(45) Date of Patent: Sep. 30, 2014

(54) OPTICAL DISC DRIVE AND DISC DETERMINATION METHOD THEREOF

(71) Applicant: Lite-On IT Corporation, Taipei (TW)

(72) Inventor: Ju-Hung Tsou, Hsinchu (JP)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/863,583

(22) Filed: Apr. 16, 2013

(65) Prior Publication Data
US 2014/0143795 A1    May 22, 2014

(30) Foreign Application Priority Data
Nov. 19, 2012   (CN) .......................... 2012 1 0466937

(51) Int. Cl.
*G11B 19/10*    (2006.01)

(52) U.S. Cl.
CPC ...................................... *G11B 19/10* (2013.01)
USPC .......................................................... 720/645

(58) Field of Classification Search
CPC ...................................................... G11B 19/10
USPC ............. 720/626, 645; 369/47.32, 47.5, 53.3, 369/53.43
See application file for complete search history.

(56) References Cited

U.S. PATENT DOCUMENTS

| | | | |
|---|---|---|---|
| 4,914,421 A * | 4/1990 | d'Alayer de Cosemore d'Arc et al. ........................... | 369/53.41 |
| 5,675,567 A * | 10/1997 | Skarda .......................... | 720/645 |
| 6,266,308 B1 * | 7/2001 | Andoh ........................ | 369/53.24 |
| 7,345,971 B2 * | 3/2008 | Huang et al. ................ | 369/47.38 |
| 7,920,450 B2 * | 4/2011 | Setono ........................ | 369/53.23 |
| 2004/0130987 A1 * | 7/2004 | Hung et al. .................. | 369/53.2 |
| 2005/0265177 A1 * | 12/2005 | Wu et al. ..................... | 369/47.36 |
| 2006/0291350 A1 * | 12/2006 | Minabe et al. .............. | 369/47.32 |

* cited by examiner

*Primary Examiner* — Angel Castro
(74) *Attorney, Agent, or Firm* — Rabin & Berdo, P.C.

(57) ABSTRACT

An optical disc drive comprises a flash memory, an optical pick-up head, a spindle motor and a control unit. The control unit generates a determination result according to whether the optical disc drive has a disc loaded therein, and stores the determination result into the flash memory when the optical disc drive receives a power. The control unit reads the determination result from the flash memory after receiving the power again, and determines whether to control the optical pick-up head and the spindle motor to execute the disc detection procedure according to the determination result. If the determination result is negative, whether the optical disc drive has a disc loaded therein is determined according to a rotation speed of the spindle motor. If the rotation speed is larger than a threshold value, the control unit determines that no disc is loaded in the optical disc drive.

4 Claims, 2 Drawing Sheets

OPTICAL DISC DRIVE AND DISC DETERMINATION METHOD THEREOF

This application claims the benefit of People's Republic of China application Serial No. 201210466937.9, filed Nov. 19, 2012, the subject matter of which is incorporated herein by reference.

BACKGROUND OF THE INVENTION

1. Field of the Invention

The invention relates in general to an electronic device, and more particularly to an optical disc drive and a disc determination method thereof.

2. Description of the Related Art

Along with the booming development in the internet and the multi-media industries, the optical disc has replaced conventional cassette tape in the storage of audio/video data. In comparison to the cassette tape, the optical disc has much larger capacity of data storage and can maintain audio/video data for a longer period with better quality. Therefore, the optical disc such as CD-ROM, DVD-ROM and CD-RW has become a mainstream product in data storage.

The conventional optical disc drive is connected to a control host, such as a computer. After the control host provides a power to the optical disc drive, no matter the optical disc drive has an optical disc loaded therein or not, the optical disc drive must firstly execute a disc detection procedure. After the disc detection procedure is completed, the optical disc drive transmits a signal to the control host to indicate that the initial preparation of the optical disc drive is completed. After the disc detection procedure is completed and a determination is made that the optical disc drive has an optical disc loaded therein, the control host controls the optical disc drive to execute a follow-up action such as reading, writing or playing the optical disc. In other words, the period from the optical disc drive receives the power provided by the control host till the disc detection procedure is completed can be defined as make-ready time of the optical disc drive.

During the disc detection procedure, the optical pick-up head spends a long time emitting the laser light and performing focusing operation and then determines whether the optical disc drive has an optical disc loaded therein according to the reflection of the laser light. In addition, during the disc detection procedure, whether the optical disc drive has an optical disc loaded therein is further determined according to a rotation speed of the spindle motor.

The conventional optical disc drive is started after receiving a power provided by a control host. After the optical disc drive is started, the optical disc drive must execute a disc detection procedure no matter whether an optical disc is loaded in the optical disc drive. Therefore, the conventional optical disc drive must complete the disc detection procedure, that is, driving the optical pick-up head and the spindle motor to execute the disc detection procedure, even when no optical disc is loaded in the optical disc drive. The conventional method makes it difficult to shorten the make-ready time of the optical disc drive.

SUMMARY OF THE INVENTION

The invention is directed to an optical disc drive and a disc determination method thereof.

According to an embodiment of the present invention, a disc determination method of an optical disc drive. The disc determination method comprises the following steps: A determination result is generated according to whether the optical disc drive has a disc loaded therein when a power is supplied to the optical disc drive. The determination result is stored to the flash memory. The determination result is read from the flash memory after the power is received again. Whether to control the optical pick-up head and the spindle motor to execute the disc detection procedure is determined according to the determination result. If the determination result is negative, whether a disc is loaded in the optical disc drive is determined according to a rotation speed of the spindle motor. If rotation speed is larger than a threshold value, a determination is made that no disc is loaded in the optical disc drive.

According to another embodiment of the present invention, an optical disc drive is provided. The optical disc drive comprises a flash memory, an optical pick-up head, a spindle motor and a control unit. The control unit generates a determination result according to whether the optical disc drive has a disc loaded therein when a power is supplied to the optical disc drive, and stores the determination result to the flash memory. The control unit reads the determination result from the flash memory after receiving the power again, and determines whether to control the optical pick-up head and the spindle motor to execute a disc detection procedure according to the determination result. If the determination result is negative, whether the optical disc drive has a disc loaded therein is determined according to a rotation speed of the spindle motor. If the rotation speed is larger than a threshold value, the control unit determines that no disc is loaded in the optical disc drive.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
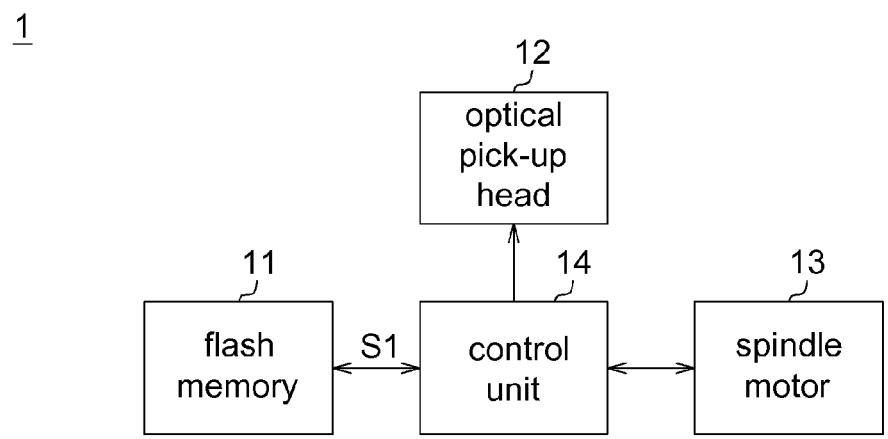
FIG. 1 shows a block diagram of an optical disc drive according to an embodiment of the invention.

Referring to FIG. 1, a block diagram of an optical disc drive according to an embodiment of the invention is shown. The optical disc drive 1 comprises a flash memory 11, an optical pick-up head 12, a spindle motor 13 and a control unit 14. The control unit 14, such as a micro-controller, is coupled to the flash memory 11, the optical pick-up head 12 and the spindle motor 13. The control unit 14 accesses data from the flash memory 11, and controls the optical pick-up head 12 and the spindle motor 13. The flash memory 11 is a non-volatile memory such as an EEPROM.

Figure 2:
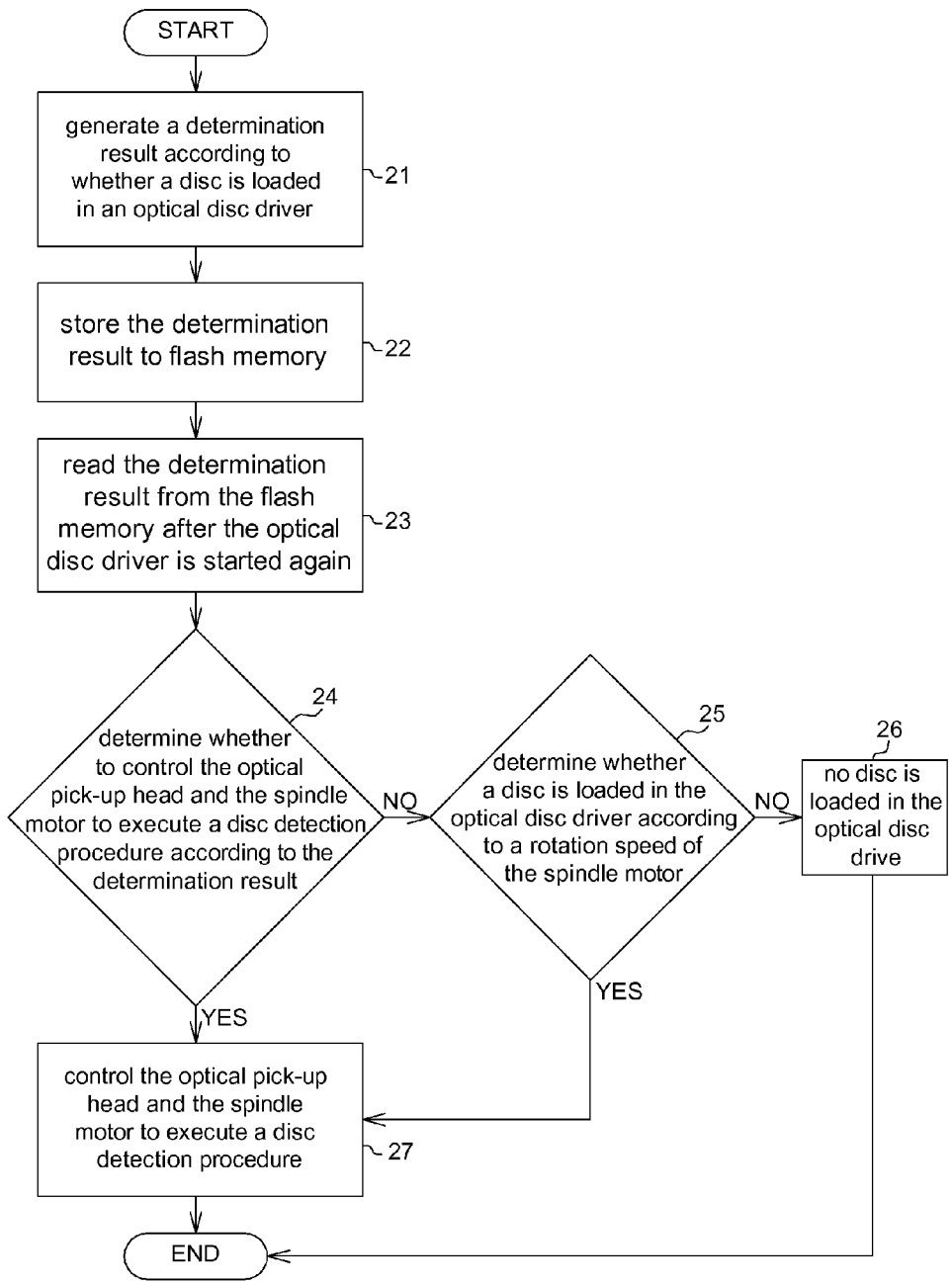
FIG. 2 shows a flowchart of a disc determination method of an optical disc drive according to an embodiment of the invention.

Referring to both FIG. 1 and FIG. 2. FIG. 2 shows a flowchart of a disc determination method of an optical disc drive according to an embodiment of the invention. The disc determination method comprises the following steps. Firstly, the method begins at step 21, after the control host provides a power to the optical disc drive 1, the control unit 14 executes a disc detection procedure, and generates a determination result S1 according to whether a disc is loaded in the optical disc drive 1. Then, the method proceeds to step 22, the control unit 14 stores the determination result S1 to the flash memory 11. Then, the method proceeds to step 23, after the control host provides the power again, the control unit 14 reads the determination result S1 from the flash memory 11. Then, the method proceeds to step 24, the control unit 14 determines whether to control the optical pick-up head 12 and the spindle motor 13 to execute a disc detection procedure according to the determination result S1.

If the determination result S1 is negative, the method executes step 25. In step 25, the control unit 14 determines whether a disc is loaded in the optical disc drive 1 according to a rotation speed of the spindle motor 13. Under the same driving voltage, the rotation speed with a disc being loaded in the optical disc drive 1 and the rotation speed without a disc being loaded in the optical disc drive 1 are different. The rotation speed when no disc is loaded in the optical disc drive 1 is faster than the rotation speed when a disc is loaded in the optical disc drive 1. The difference in rotation speed further assures the accuracy of the determination of step 25. If the rotation speed of the spindle motor 13 is larger than a threshold value, the method proceeds to step 26, the control unit 14 determines that no disc is loaded in the optical disc drive 1, and terminates the process of the disc determination method. According to above discussion, if the determination result S1 is negative and the rotation speed of the spindle motor 13 is larger than a threshold value, then a determination that no disc is loaded in the optical disc drive 1 can be made. Since it is determined that no disc is loaded in the optical disc drive 1, the process of the disc determination method can be terminated accordingly.

Conversely, if the rotation speed is not larger than the threshold value, the control unit 14 controls the optical pick-up head 12 and the spindle motor 13 to execute a disc detection procedure. If the determination result S1 is affirmative, the method executes step 27. In step 27, the control unit 14 controls the optical pick-up head 12 and the spindle motor 13 to execute a disc detection procedure. In the disc detection procedure, the control unit 14 controls the optical pick-up head 12 to emit a laser light, and determines whether the optical disc drive 1 has an optical disc loaded therein according to the reflection of the laser light. Furthermore, the control unit 14 controls the spindle motor 13, and determines whether the optical disc drive 1 has an optical disc loaded therein according to the rotation speed of the spindle motor 13. After step 27 is completed, the process of the disc determination method is terminated accordingly.

In disc detection procedure, the process of controlling the optical pick-up head 12 to perform a focusing operation by the control unit 14 is time consuming. The make-ready time of the optical disc drive 1 would be too long if the optical disc drive 1 must execute the disc detection procedure even when no optical disc is loaded in the optical disc drive 1. In the embodiment, the control unit 14 will determine whether to omit one step of the disc detection procedure according to the previously recorded determination result S1 and rotation speed to shorten the make-ready time of the optical disc drive 1. After the two preceding steps, if the determination result S1 indicates that no disc is loaded in the optical disc drive 1, then the make-ready time of the optical disc drive 1 can be shortened by omitting the step of controlling the optical pick-up head 12 by the control unit 14 to emit a laser light and determine whether an optical disc is loaded in the optical disc drive 1 according to the reflection of the laser light.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disc determination method of an optical disc drive, comprising:
   executing a disc detection procedure by a control unit after receiving a power to determine whether the optical disc drive has a disc loaded therein and generating a determination result;
   storing the determination result to a flash memory;
   reading the determination result from the flash memory by the control unit after receiving the power again;
   determining whether to control an optical pick-up head and a spindle motor to execute the disc detection procedure according to the determination result;
   determining whether the optical disc drive has a disc loaded therein according to a rotation speed of the spindle motor if the determination result is negative; and
   determining that no disc is loaded in the optical disc drive if the rotation speed is larger than a threshold value.

2. The disc determination method according to claim 1, wherein if the rotation speed is not larger than the threshold value, the control unit controls the optical pick-up head and the spindle motor to execute the disc detection procedure.

3. The disc determination method according to claim 1, further comprising:
   controlling the optical pick-up head and the spindle motor to execute the disc detection procedure if the determination result is affirmative.

4. The disc determination method according to claim 1, wherein a control host provides the power.

* * * * *